Patented Nov. 30, 1926.

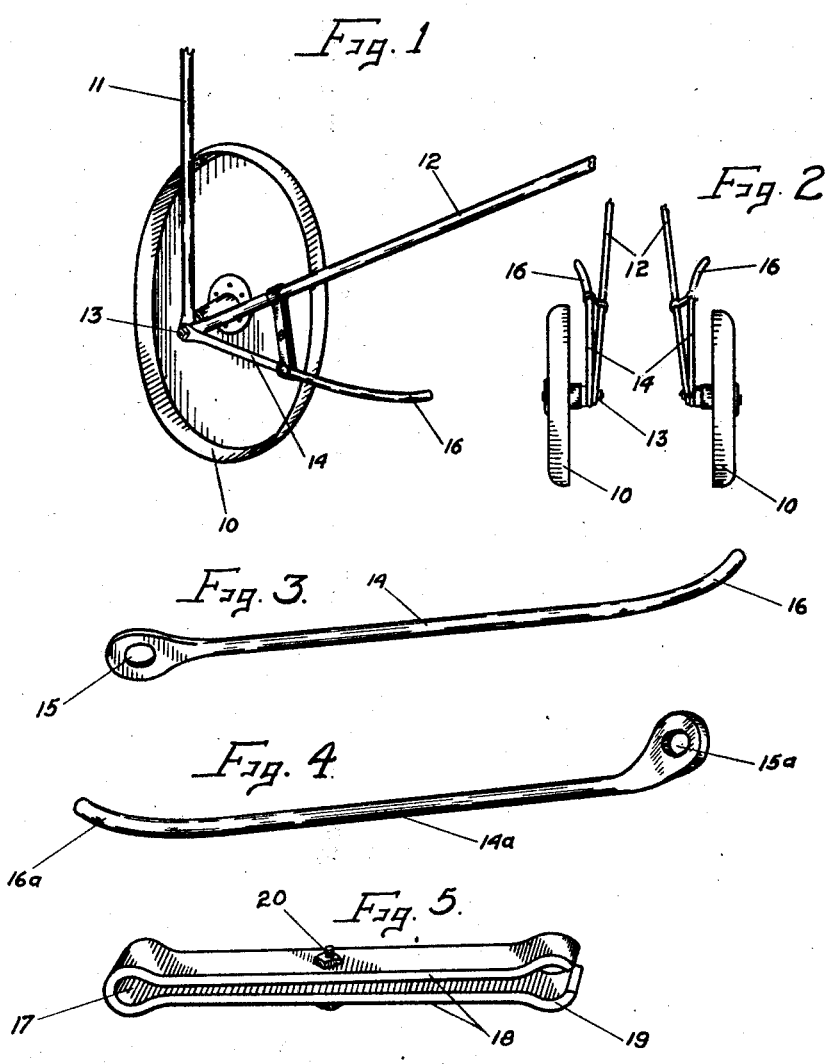

1,609,043

UNITED STATES PATENT OFFICE.

WILLARD E. WHITE, OF ANSELMO, NEBRASKA.

ATTACHMENT FOR LISTED-CORN CULTIVATORS.

Application filed November 16, 1925. Serial No. 69,397.

My invention relates to attachments for listed corn cultivators.

Listed corn cultivators are cultivators which are designed for cultivating listed corn and similar crops. They are provided with a pair of furrow guide wheels for each cultivating unit, the guide wheels being adapted to travel in the lister furrow and to keep the implement in alignment with the corn rows during travel. The furrow guide wheels are followed by the cultivating discs. In windy weather, especially when the wind is blowing in a direction transversely to the corn rows, the corn stalks are bent over by the wind, frequently to such an extent that they are caught by the furrow guide wheels and then cut up by the discs. The destruction of corn stalks in this way is often so great that the farmer is compelled to stop work until the wind quiets down, even though the conditions are otherwise ideal for cultivating corn.

My invention has for its object the provision of a very simple attachment which may be secured to any of the cultivators on the farms, and which will straighten the corn stalks so that the cultivator may pass over them without injuring them.

Referring now to the drawings,

Figure 1 is a view in perspective of one of the furrow guide wheels with its braces and showing my attachment secured thereto.

Figure 2 is a plan view showing a pair of the furrow guide wheels with my invention secured thereto.

Figure 3 is a view of the guide finger.

Figure 4 is a view of the guide finger showing a slight modification.

Figure 5 is a perspective view of the clamp which connects the guide finger to the inclined brace of the furrow guide wheel.

While there is some variation in the implements now on the market as regards the connections for the furrow guide wheels, the most common construction includes guide wheels 10 secured to shafts and having an upright brace 11 and a forwardly and upwardly inclined brace 12. The braces are usually secured to the shaft of the guide wheel by means of the nut 13 as shown in Figure 1.

My invention includes a finger 14 having an eye for engaging the shaft beneath the nut 13 and a clamp for securing the finger 14 to the brace 12. The finger 14 is flattened at its inner end and is provided with an eye 15 while at its outer end it is bent at 16 in such manner that when the finger is in position the end 16 will flare outwardly as shown in Figure 2. The finger 14, as shown in Figure 3 differs from the finger 14$^a$ shown in Figure 4, only in the fact that the flattened end having the eye is bent so as to engage shafts which are somewhat inclined. Either finger shown in Figures 3 and 4 may easily be bent in the vise or on the anvil to fit any particular cultivator but it has been my experience with the two fingers shown in the drawings that one or the other will fit every listed corn cultivator found on the farm.

Since the finger extends to some distance forward of its connection with the shaft it is necessary to provide some kind of brace. The brace which I have provided is shown in Figure 5. It consists of a strip of strap iron which is bent so as to provide a looped portion 17, two parallel portions 18, and a looped portion 19. The parallel portions 18 are provided with aligning apertures for receiving the bolt 20. The strap iron is to some extent resilient so that when the nut on the bolt 20 is loosened, the loop 19 will open. In applying the brace, the loop 17 is slipped over the end of the finger 14 while the loop 19 is snapped over the brace 12, the nut being then tightened to secure the parts in position. The clamp thus serves as a very rigid brace but it also provides a means for adjusting the fingers 14. The rear end of the finger is, of course, fixed in position but the front end of the fingers have a considerable range of vertical adjustment which is obtained by sliding the clamp backward or forward until the fingers 14 have the proper inclination, and then locking the clamp by means of the bolt 20.

The device is simple in construction and can be made cheaply. Both parts are made from material which may be purchased by the pound. The fingers 14 are simply rods of suitable length and having one end flattened by forging and the other end bent. The clamp is formed from strap iron by the use of very simple tools. The whole device may be made on the farm by the use of tools which every farmer has as part of his equipment. As a factory product it may be turned out in a more refined form and at a considerably reduced labor cost.

The device may be attached to or detached from the implement in a few minutes' time, only a wrench being required. It may be adjusted so that the fingers 14 will be at the most effective height during each of the successive cultivations. On hot, dry, windy days the attachment will be found to have the greatest value to corn farmers. On such days the weeds are apt to be growing rapidly and crusts are forming in the surface of the soil. The need for cultivation is more urgent at such a time, but when wind is blowing strongly cultivation is impossible unless provision is made for preventing destruction of the corn stalks. My invention provides for such means in the simplest possible manner and at the lowest possible cost.

Having thus described my invention in such full, clear, and exact terms that its construction and utility will be readily understood by others skilled in the art to which it pertains, what I claim as new and desire to secure by Letters Patent of the United States is:

1. An attachment for listed corn cultivators having a pair of furrow guide wheels with each cultivating gang, said attachment comprising a rod having an eye for receiving the end of the shaft of a furrow guide wheel, said rod being inclined forwardly and outwardly, and a brace connected to said rod and to the brace of the furrow guide wheel.

2. An attachment for listed corn cultivators having furrow guide wheels for traveling in the lister furrows and having braces secured to the shafts secured to the furrow wheels and to the implement frame, said attachment including rods which are adapted to be secured to the shafts of the furrow wheels to project forwardly and outwardly therefrom, and members which are adapted to connect said rods to the furrow wheel braces, said members being slidable lengthwise of said rods to adjust the elevation of the forward ends of said rods, and means for locking said members in any desired position of adjustment.

3. In combination, a rod having an eye at one end portion thereof for engaging the end portion of the shaft of a furrow guide wheel of a listed corn cultivator so as to project forwardly with reference thereto, a brace member comprising two parallel portions having therebetween a closed eye in its lower extremity and an open eye in its upper extremity, and a bolt and nut connecting the two parallel portions of said brace member, the lower eye of said brace member being adapted to slidably receive said rod and the upper eye of said brace member being adapted to engage a fixed part of the listed corn cultivator, said brace having a clamping action when said nut is screwed down on said bolt, the forward extremity of said rod being adjustable in height by the adjustment of said brace.

In testimony whereof, I affix my signature.

WILLARD E. WHITE.